(12) United States Patent
Fu (10) Patent No.: US 9,548,668 B2
(45) Date of Patent: Jan. 17, 2017

(54) HYBRID POWER CONVERTER AND METHOD

(71) Applicant: Futurewei Technologies, Inc., Plano, TX (US)

(72) Inventor: Dianbo Fu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 10 days.

(21) Appl. No.: 14/656,627

(22) Filed: Mar. 12, 2015

(65) Prior Publication Data

US 2015/0263634 A1  Sep. 17, 2015

Related U.S. Application Data

(60) Provisional application No. 61/953,602, filed on Mar. 14, 2014.

(51) Int. Cl.
*H02M 1/42* (2007.01)
*H02M 3/335* (2006.01)
*H02M 3/158* (2006.01)
*H02M 1/00* (2006.01)

(52) U.S. Cl.
CPC ..... *H02M 3/33592* (2013.01); *H02M 3/33569* (2013.01); *H02M 3/1582* (2013.01); *H02M 2001/007* (2013.01); *H02M 2001/0058* (2013.01); *Y02B 70/1425* (2013.01); *Y02B 70/1433* (2013.01); *Y02B 70/1475* (2013.01); *Y02B 70/1491* (2013.01)

(58) Field of Classification Search
CPC .............. H02M 3/337; H02M 3/33592; H02M 2001/007; H02M 3/33584; Y02B 70/1433

USPC ...... 363/16–17, 21.01, 21.02, 21.06, 24, 39, 363/41, 98, 127, 131, 133; 323/234, 266, 323/271–274

See application file for complete search history.

(56) References Cited

U.S. PATENT DOCUMENTS

| | | | | |
|---|---|---|---|---|
| 5,208,738 A * | 5/1993 | Jain | ........................ | H02M 3/337 363/132 |
| 6,018,467 A * | 1/2000 | Majid | ............... | H02M 3/33523 363/16 |
| 6,344,979 B1 * | 2/2002 | Huang | .................. | H02M 3/337 363/131 |
| 6,654,261 B2 * | 11/2003 | Welches | ................ | H02M 1/126 363/131 |
| 8,134,851 B2 * | 3/2012 | Soldano | ............ | H02M 3/33592 363/127 |
| 8,319,487 B2 * | 11/2012 | Michishita | ............ | H02M 3/156 323/223 |
| 8,410,889 B2 * | 4/2013 | Garrity | ............... | H01F 27/2847 336/172 |
| 8,705,252 B2 * | 4/2014 | Duvnjak | ............. | H02M 1/4258 363/126 |

* cited by examiner

*Primary Examiner* — Rajnikant Patel
(74) *Attorney, Agent, or Firm* — Futurewei Technologies, Inc.

(57) ABSTRACT

A converter comprises a non-isolated stage coupled to an input dc source, wherein the non-isolated stage is configured to operate at a PWM mode and the non-isolated stage is configured to operate at a buck converter mode in response to a first input voltage and operate to a boost converter mode in response to a second input voltage and a resonant stage coupled between the non-isolated stage and a load, wherein the resonant stage is configured to operate at a resonant mode.

18 Claims, 6 Drawing Sheets

HYBRID POWER CONVERTER AND METHOD

CROSS REFERENCE TO RELATED APPLICATIONS

This application is related to, and claims priority to U.S. Provisional Application No. 61/953,602, titled, "Apparatus and Method for Power Converters" filed on Mar. 14, 2014, which is herein incorporated by reference.

TECHNICAL FIELD

The present disclosure relates to a power converter, and, in particular embodiments, to a hybrid power converter.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, LLC resonant converters and the like.

As technologies further advance, bus converters have been widely employed in the telecommunication industry. The bus voltages may be divided into three categories, a 12V bus voltage converted from a 48V input direct current (DC) power supply, a 48V bus voltage converted from a 380V input DC power supply and a 12V bus voltage converted from a 380V input DC power supply. A bus converter not only converts the input voltage from a higher level to a lower level, but also provides isolation through a magnetic device such as transformers and/or the like.

The intermediate bus voltage such as 12V may function as an input power bus for a plurality of downstream non-isolated power converters. The downstream non-isolated power converters may be implemented as step-down DC/DC converters such as buck converters, step-up DC/DC converters such as boost converters, linear regulators, any combinations thereof. The downstream non-isolated power converters operate under a tight control loop so that fully regulated output voltages are fed into their respective loads.

SUMMARY

These and other problems are generally solved or circumvented, and technical advantages are generally achieved, by preferred embodiments of the present disclosure which provide a hybrid power converter.

In accordance with an embodiment, a converter comprises a non-isolated stage coupled to an input DC source, wherein the non-isolated stage, in response to an input voltage, operates in either a buck converter mode or a boost converter mode and a resonant stage coupled between the non-isolated stage and a load, wherein the resonant stage is configured to operate at a resonant mode.

In accordance with another embodiment, a system comprises a non-isolated stage comprising two switches and an inductor, wherein the non-isolated stage, in response to an input voltage, operates in either a buck converter mode or a boost converter mode.

The system further comprises a resonant stage coupled to the non-isolated stage, wherein the resonant stage is configured to operate at a fixed frequency resonant mode.

In accordance with yet another embodiment, a method comprises detecting an input voltage of a power converter and operating a non-isolated stage in a pulse width modulation (PWM) mode, wherein the non-isolated stage is coupled to an input direct current (DC) source.

The method further comprises operating a resonant stage, wherein the resonant stage is coupled between the non-isolated stage and a load, wherein upon detection of a first voltage the non-isolated stage operates in a buck converter mode and upon detection of a second voltage the non-isolated stage operates in a boost converter mode.

An advantage of an embodiment of the present disclosure is a hybrid power converter providing higher efficiency as well as tight voltage regulation. In particular, a resonant stage of the hybrid power converter may be implemented as an unregulated LLC resonant converter operating at a fixed switching approximately equal to the resonant frequency of the LLC resonant converter. As a result, the LLC resonant converter may achieve high efficiency through zero voltage switching of the primary switches and zero voltage switching and/or zero current switching of the secondary switches.

On the other hand, a non-isolated stage of the hybrid power converter is tightly regulated through configuring the non-isolated stage to operate at either a buck converter mode or a boost converter mode. Furthermore, only a fraction of the total power of the hybrid power converter passes through both the non-isolated stage and the resonant stage. As a result, the hybrid power converter may achieve a better efficiency in comparison with conventional two-stage power converters.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a hybrid power converter comprising a non-isolated stage and an isolated stage connected in cascade. The disclosure may also be applied, however, to a variety of power converters. For example, the isolated stage may be implemented as full bridge converters, half bridge converters, forward converters, flyback converters, any combinations thereof and/or the like. Hereinafter, various embodiments will be explained in detail with reference to the accompanying drawings.

Figure 1:
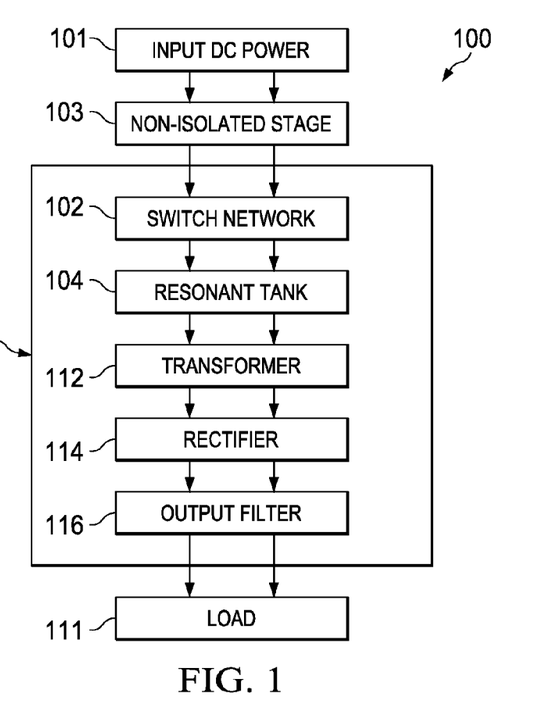
FIG. 1 illustrates a block diagram of a hybrid power converter in accordance with various embodiments of the present disclosure.

FIG. 1 illustrates a block diagram of a hybrid power converter in accordance with various embodiments of the present disclosure. The hybrid power converter 100 comprises a first stage 103 and a second stage 200, where the first stage 103 and the second stage 200 are connected in cascade as shown in FIG. 1.

In some embodiments, the first stage 103 may be implemented as a non-isolated converter. Throughout the description, the first stage 103 may be alternatively referred to as a non-isolated stage 103.

In some embodiments, the second stage 200 may be implemented as a variety of power converters such as full bridge converters, half bridge converters, forward converters, flyback converters, any combinations thereof and/or the like. In some embodiments, the second stage 200 may be an inductor-inductor-capacitor (LLC) resonant converter. Throughout the description, the second stage 200 may be alternatively referred to as an isolated stage 200 or an LLC resonant converter 200.

As shown in FIG. 1, the non-isolated stage 103 is coupled to the two output terminals of an input DC power source 101. The LLC resonant converter 200 is coupled between the non-isolated stage 103 and a load 111. The input DC power source 101 may be telecommunication power supplies converting a utility line voltage to a DC voltage. Alternatively, the input DC power source 101 may be a solar panel array. Furthermore, the input DC power source 101 may be an energy storage device such as rechargeable batteries, fuel cells and/or the like. The load 111 represents the power consumed by a circuit coupled to the LLC resonant converter 200. Alternatively, the load 111 may refer to various downstream converters coupled to the output of the LLC resonant converter 200.

The LLC resonant converter 200 may comprise a switch network 102, a resonant tank 104, a transformer 112, a rectifier 114 and an output filter 116. The switch network 102 is also known as a primary switch network. Throughout the description, the switch network 102 is alternatively referred to as the primary switch network 102. Likewise, the rectifier 114 is also known as a secondary rectifier. Throughout the description, the rectifier 114 is alternatively referred to as the secondary rectifier 114. As shown in FIG. 1, the primary switch network 102, the resonant tank 104, the transformer 112, the secondary rectifier 114 and the output filter 116 are coupled to each other and connected in cascade between the input DC power source 101 and the load 111.

The primary switch network 102 may comprise primary side switches of a full bridge resonant converter according to some embodiments. Alternatively, the primary switch network 102 may comprise the primary side switches of other bridge converters such as a half-bridge resonant converter, a push-pull resonant converter and the like. The detailed configuration of the primary switch network 102 will be described below with respect to FIG. 2.

The resonant tank 104 may be implemented in a variety of ways. For example, the main resonant tank comprises a series resonant inductor, a parallel resonant inductor and a series resonant capacitor (shown in FIG. 2).

The series resonant inductor and the parallel resonant inductor may be implemented as external inductors. A person skilled in the art will recognize that there may be many variation, alternatives and modifications. For example, the series resonant inductor may be implemented as a leakage inductance of the transformer 112.

The resonant tank 104 may include three key resonant elements, namely the series resonant inductor, the series resonant capacitor and the parallel resonant inductor. Such a configuration is commonly referred to as an LLC resonant converter. According to the operating principle of LLC resonant converters, at a switching frequency approximately equal to the resonant frequency of the resonant tank 104, the resonant tank 104 helps to achieve zero voltage switching for the primary side switching elements and zero current switching for the secondary side switching elements.

The LLC resonant converter 200 may further comprise a transformer 112, a secondary rectifier 114 and an output filter 116. The transformer 112 provides electrical isolation between the primary side and the secondary side of the LLC resonant converter 200. In accordance with an embodiment, the transformer 112 may be formed of two transformer windings, namely a primary transformer winding and a secondary transformer winding. Alternatively, the transformer 112 may have a center tapped secondary so as to have three transformer windings including a primary transformer winding, a first secondary transformer winding and a second secondary transformer winding.

It should be noted that the transformers described above and throughout the description are merely examples, which should not unduly limit the scope of the claims. One of ordinary skill in the art would recognize many variations, alternatives, and modifications. For example, the transformer 112 may further comprise a variety of bias windings and gate drive auxiliary windings.

The secondary rectifier 114 converts an alternating polarity waveform received from the output of the transformer 112 to a single polarity waveform. When the transformer 112 is of a center tapped secondary, the secondary rectifier 114 may be formed of a pair of switching elements such as n-type metal oxide semiconductor (NMOS) transistors. Alternatively, the secondary rectifier 114 may be formed of a pair of diodes. On the other hand, when the transformer 112 is of a single secondary winding, the secondary rectifier 114 may be a full-wave synchronous rectifier coupled to the single secondary winding of the transformer 112.

Furthermore, the secondary rectifier 114 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the secondary rectifier 114 are well known in the art, and hence are not discussed herein.

The output filter 116 is used to attenuate the switching ripple of the LLC resonant converter 200. According to the operation principles of isolated DC/DC converters, the output filter 116 may be an L-C filter formed by an inductor and a plurality of capacitors. One person skilled in the art will recognize that some isolated DC/DC converter topologies such as forward converters may require an L-C filter. On the other hand, some isolated DC/DC converter topologies such as LLC resonant converters may include an output filter formed by a capacitor. One person skilled in the art will further recognize that different output filter configurations apply to different power converter topologies as appropriate. The configuration variations of the output filter 116 are within various embodiments of the present disclosure.

Figure 2:
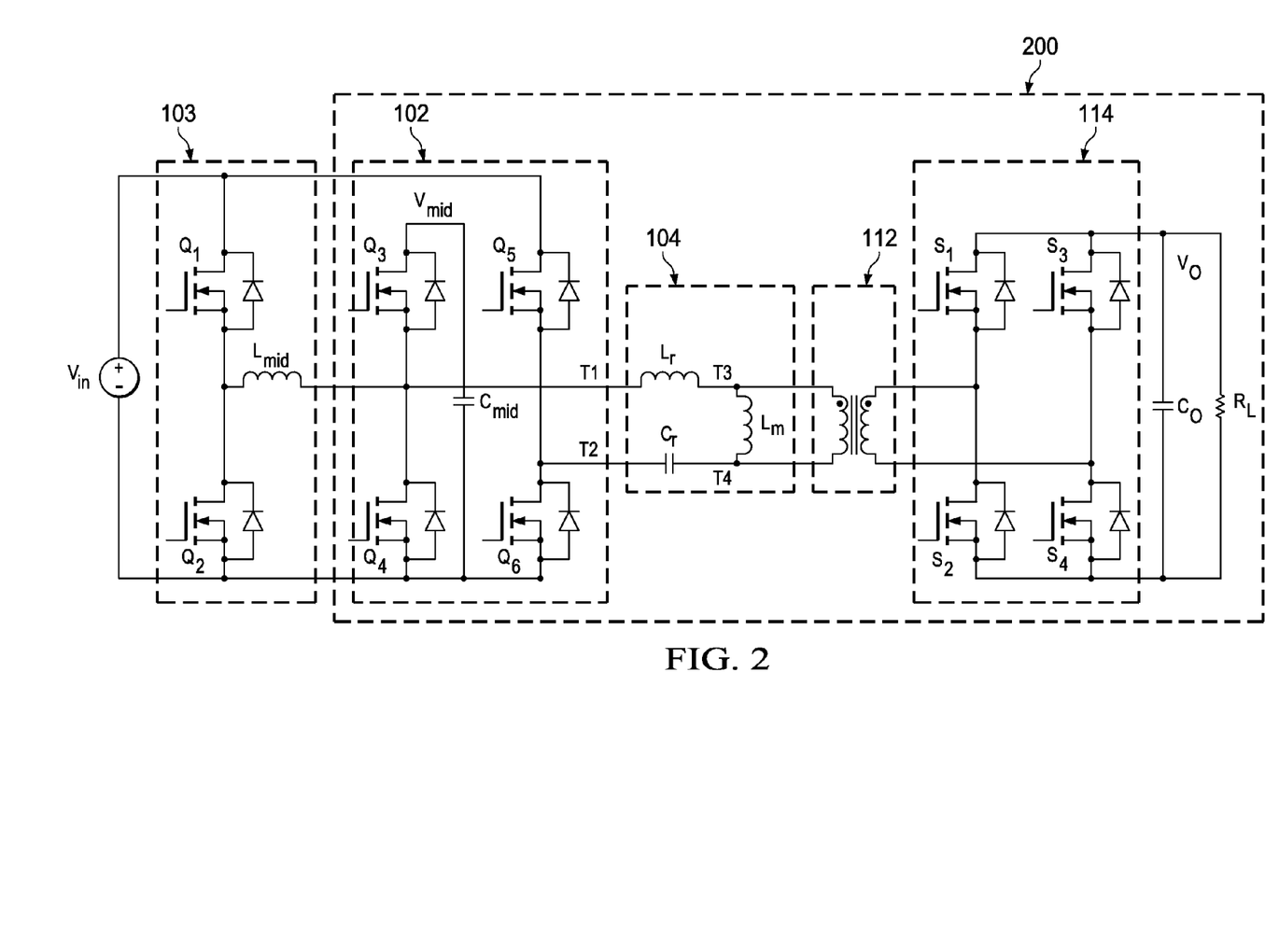
FIG. 2 illustrates a schematic diagram of the hybrid power converter shown in FIG. 1 in accordance with various embodiments of the present disclosure.

FIG. 2 illustrates a schematic diagram of the hybrid power converter shown in FIG. 1 in accordance with various embodiments of the present disclosure. The non-isolated stage 103 comprises two switching elements, namely Q1 and Q2. As shown in FIG. 2, switching elements Q1 and Q2 are connected in series between two output terminals of the input DC power source Vin. According to some embodiments, switching elements Q1 and Q2 are implemented as MOSFET or MOSFETs connected in parallel, any combinations thereof and the like.

According to alternative embodiments, Q1 and Q2 may be insulated gate bipolar transistor (IGBT) devices. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

The non-isolated stage 103 further comprises an inductor Lmid. A first terminal of the inductor Lmid is connected to the common node of Q1 and Q2. A second terminal of the inductor Lmid is connected to the common node of Q3 and Q4 as shown in FIG. 2. Depending on different applications and design needs, the non-isolated stage 103 may be configured as a step-up power converter or a step-down power converter.

In some embodiments, Q3 and Q4 of the primary switch network 102, and the non-isolated stage 103 may form a step-up power converter. Cmid may function as an output capacitor of the step-up power converter. As a result, the voltage at Cmid is higher than the input voltage Vin. The operation principles of a step-up power converter are well known, and hence are not discussed in detail herein.

In some embodiments, Q3 and Q4 of the primary switch network 102, and the non-isolated stage 103 may function as a step-down power converter. Cmid may function as an output capacitor of the step-down power converter. As a result, the voltage at Cmid is lower than the input voltage Vin. The operation principles of a step-down power converter are well known, and hence are not discussed in detail herein.

In operation, a controller (not shown) may detect an input voltage and/or an output voltage of the hybrid power converter 100. Assuming the turns ratio of the transformer 112 is 1:1, when the input voltage is higher than the output voltage, the non-isolated stage 103 is configured to operate at a step-down power converter mode. The LLC resonant converter 200 is configured to operate at a fixed switching frequency approximately equal to the resonant frequency of the LLC resonant converter 200.

On the other hand, when the input voltage is lower than the output voltage, the non-isolated stage 103 is configured to operate at a step-up power converter mode. The LLC resonant converter 200 is configured to operate at a fixed switching frequency approximately equal to the resonant frequency of the LLC resonant converter 200.

It should be noted that the switching frequency of the non-isolated stage 103 is equal to the switching frequency of the LLC resonant converter 200. Furthermore, in order to eliminate undesirable beat frequencies between the non-isolated stage 103 and the LLC resonant converter 200, the gate drive signals of Q1 and Q2 are in sync with the gate drive signals of the LLC resonant converter 200.

One advantageous feature of having the non-isolated stage 103 is that the non-isolated stage 103 helps the hybrid power converter 100 achieve a buck-boost voltage regulation at Vmid, which is one input voltage of the LLC resonant converter 200. The regulation of the hybrid power converter 100 may be achieved through adjusting Vmid. As a result, the LLC resonant converter 200 may be able to operate as an unregulated power supply. In other words, the LLC resonant converter 200 may operate at a fixed switching frequency. Such a fixed switching frequency helps the LLC resonant converter 200 achieve higher efficiency at a variety of operating conditions.

The primary switch network 102 includes four switching elements, namely Q3, Q4, Q5 and Q6. As shown in FIG. 2, a first pair of switching elements Q3 and Q4 are connected in series between two terminals of Cmid. A second pair of switching elements Q5 and Q6 are connected in series between the two terminals of the input power source Vin.

The common node of the switching elements Q3 and Q4 is coupled to a first input terminal T1 of the resonant tank 104. Likewise, the common node of the switching elements Q5 and Q6 is coupled to a second input terminal T2 of the resonant tank 104.

The primary switch network 102 includes two legs. A first leg comprises switching elements Q3 and Q4. A second leg comprises switching elements Q5 and Q6. As shown in FIG. 2, the first leg is connected to Vmid. The second leg is connected to the input voltage Vin. As such, while the LLC resonant converter 200 operates at a fixed frequency, the output voltage of the LLC resonant converter 200 may be tightly regulated through adjusting Vmid.

The switching elements Q3, Q4, Q5 and Q6 form a primary side switching network of a full bridge resonant converter. According to some embodiments, switching elements Q3, Q4, Q5 and Q6 are implemented as MOSFET or MOSFETs connected in parallel, any combinations thereof and/or the like.

According to alternative embodiments, the primary switches (e.g., switch Q3) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full bridge LLC resonant converter (e.g., full bridge LLC resonant converter shown in FIG. 2), the LLC resonant converter 200 shown in FIG. 2 may have many variations, alternatives, and modifications. For example, half bridge converters, push-pull converters may be alternatively employed. The full bridge resonant converter illustrated herein is limited solely for the purpose of clearly illustrating the inventive aspects of the various embodiments. The present disclosure is not limited to any particular power topology.

It should further be noted that while FIG. 2 illustrates four switches Q3, Q4, Q5, and Q6, various embodiments of the present disclosure may include other variations, modifications and alternatives. For example, a separate capacitor may be connected in parallel with each switch of the primary side switching network. Such a separate capacitor helps to better control the timing of the resonant process of the LLC resonant converter 200.

It should further be noted that the voltage stress of the switches (e.g., Q1-Q6) is less than or equal to 60 V when the input voltage Vin is in a range from about 36 V to about 60 V. As a result, Q1, Q2, Q3, Q4, Q5 and Q6 can be implemented as MOSFETS having a voltage rating of 100 V.

FIG. 2 further illustrates the resonant tank 104 is coupled between the primary switch network 102 and the transformer 112. The resonant tank 104 is formed by a series resonant inductor Lr, a series resonant capacitor Cr and a parallel inductance Lm. As shown in FIG. 2, the series resonant inductor Lr and the series resonant capacitor Cr1 are connected in series and further coupled to the primary side of the transformer 112.

It should be noted while FIG. 2 shows the series resonant inductor Lr is an independent component, the series resonant inductor Lr may be replaced by the leakage inductance of the transformer 112. In other words, the leakage inductance (not shown) may function as the series resonant inductor Lr.

It should further be noted that the series resonant inductor Lr may be of a low Q. Such a low Q design helps the hybrid power converter 100 achieve high efficiency as well as high power density.

The transformer 112 may be of a primary winding and a single secondary winding. The primary winding is coupled to terminals T3 and T4 of the resonant tank 104 as shown in FIG. 2. The secondary winding is coupled to the load 111 through the secondary rectifier 114, which is formed by switches S1, S2, S3 and S4. The secondary rectifier 114 formed by switches S1, S2, S3 and S4 may be alternatively referred to as a synchronous rectifier 114 throughout the description.

It should be noted the transformer structure shown in FIG. 2 is merely an example. One person skilled in the art will recognize many alternatives, variations and modification. For example, the secondary side of the transformer 112 may be a center tapped winding. As a result, the secondary side may employ a synchronous rectifier formed by two switching elements. The operation principle of a synchronous rectifier coupled to a single secondary winding or a center tapped transformer secondary side is well known, and hence is not discussed in further detail herein.

It should further be noted that the power topology of the LLC resonant converter 200 may be not only applied to the rectifier as shown in FIG. 2, but also applied to other secondary configurations, such as voltage doubler rectifiers, current doubler rectifiers, any combinations thereof and/or the like.

The hybrid power converter 100 comprises the non-isolated stage 103 and the LLC resonant converter 200. The non-isolated stage 103 may function as a voltage regulation stage. The LLC resonant converter 200 may be an unregulated stage. In some embodiments, the switches (e.g., Q3, Q4, Q5 and Q6) of the LLC resonant converter 200 may operate at a duty cycle of about 50%.

The LLC resonant converter 200 may operate at a frequency approximately equal to the resonant frequency of resonant tank 104. As a result, the primary switches (e.g., Q3, Q4, Q5 and Q6) may achieve zero voltage switching and the secondary switches (e.g., S1, S2, S3 and S4) may achieve zero voltage switching and/or zero current switching. By employing a suitable control mechanism, the switches (e.g., Q1 and Q2) of the non-isolated stage 103 may achieve zero voltage switching. The detailed process of how to achieve a zero voltage transition of Q1 and Q2 will be described below with respect to FIG. 3.

The voltage at the output of the hybrid power converter 100 is given by the following equation:

$$Vo = \frac{(Vin + Vmid) \cdot Ns}{2 \cdot Np} \qquad (1)$$

where Np is the number of the turns of the primary side winding of the transformer 112 and Ns is the number of the turns of the secondary side winding of the transformer 112. Equation (1) above indicates the output voltage of the hybrid power converter 100 can be tightly regulated by adjusting Vmid in response to different input voltages and load conditions.

The voltage at the capacitor Cmid of the hybrid power converter 100 is given by the following equation:

$$Vmid = 2D1 \cdot Vin \qquad (2)$$

where D1 is the duty cycle of the switch Q1. D1 is in a range from 0 to 1. As a result, the range of Vmid is from 0 to two times Vin. In other words, the voltage at the capacitor Cmid may be higher than the input voltage Vin when the non-isolated stage 103 operates at a boost (step-up) converter mode. On the other hand, the voltage at the capacitor Cmid may be lower than the input voltage Vin when the non-isolated stage 103 operates at a buck (step-down) converter mode.

Both the non-isolated stage 103 and the LLC resonant converter 200 may deliver power to the output of the hybrid power converter 100. The portion attributed to the non-isolated stage 103 may be defined as Ppwm. Ppwm is given by the following equation:

$$\frac{Ppwm}{Po} = \frac{Vmid}{Vin + Vmid} \qquad (3)$$

where Po is the output power of the hybrid power converter 100.

Figure 3:
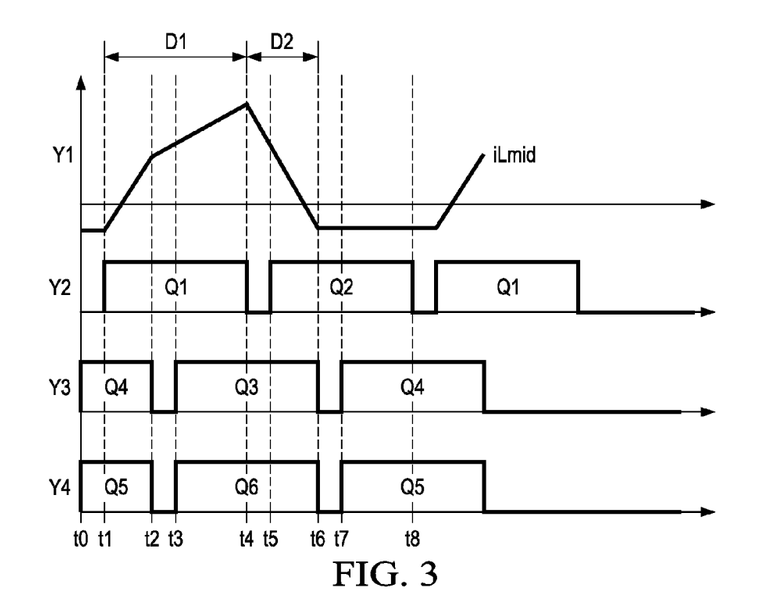
FIG. 3 illustrates a timing diagram of various signals in the hybrid power converter 100 shown in FIG. 2 in accordance with various embodiments of the present disclosure.

FIG. 3 illustrates a timing diagram of various signals in the hybrid power converter 100 shown in FIG. 2 in accordance with various embodiments of the present disclosure.

The horizontal axis of FIG. 3 represents intervals of time. There may be four vertical axes. The first vertical axis Y1 represents the current flowing through the inductor Lmid. The second vertical axis Y2 represents gate drive signals of Q1 and Q2. The third vertical axis Y3 represents the gate drive signals of Q3 and Q4. The fourth vertical axis Y4 represents the gate drive signals of Q5 and Q6.

During the time interval from t0 to t1, switch Q1 is turned off. Switches Q4 and Q5 are on as shown in FIG. 3. At the time instant t1, the switch Q1 is turned on in response to a gate drive voltage applied to the gate of Q1. The turned-on Q1 and Q4 lead to the input voltage Vin applied to the inductor Lmid. The current flowing into the inductor Lmid may not change instantaneously. As shown in FIG. 3, in response to the input voltage Vin applied to the inductor Lmid, the current iLmid ramps up from a negative vale to a positive value at the time instant t2. The ramp-up slope from t1 to t2 exhibits an approximately linear behavior as shown in FIG. 3.

It should be noted that the negative value of iLmid at the time instant t1 helps the switch Q1 achieve zero voltage switching. In particular, when iLmid is negative (flowing from the common node of Q3 and Q4 to the common node of Q1 and Q2), the body diode of Q1 conducts. The conducting of the body diode of Q1 creates a voltage approximately equal to zero across the drain and source of Q1. As a result, Q1 is able to have a ZVS turn-on.

During the time interval from t2 to t3, the switches Q4 and Q5 are turned off at the time instant t2 as shown in FIG. 3. The current iLmid keeps increasing as shown in FIG. 3. At the time instant t3, both switch Q3 and switch Q6 are turned on. During the time interval from t3 to t4, the current iLmid keeps increasing until the switch Q1 is turned off at the time instant t4. As shown in FIG. 3, the current iLmid reaches its peak value at the time instant t4.

During the time interval from t2 to t4, the current iLmid may charge the capacitor Cmid and deliver power to the output of the hybrid power converter 100 through the LLC resonant converter 200.

The time inverter from t4 to t5 helps the switch Q2 achieve zero voltage switching. As shown in FIG. 3, after the switch Q1 is turned off, the positive inductor current iLmid helps to discharge the voltage across the switch Q2. As a result, the switch Q2 may achieve zero voltage switching at the time instance t5.

During the time interval from t5 to t6, the switch Q2 is turned on at the time instant t5 as shown in FIG. 3. In response to the turn-on of the switch Q2, the current iLmid keeps decreasing during the time interval from t5 to t6 as shown in FIG. 3. It should be noted that the turn-on of Q2 helps to reset the inductor Lmid.

During the time interval from t6 to t7, the switches Q3 and Q6 are turned off at the time instant t6 as shown in FIG. 3. In response to the turn-off of the switches Q3 and Q6, the current iLmid is kept constant as shown in FIG. 3. Referring back to FIG. 2, the negative current of iLmid flows through a loop including the body diode of Q4, the inductor Lmid and Q2. The current iLmid may stay at a negative current until the switch Q1 is turned on. Such a negative current helps Q1 and Q4 achieve zero voltage switching.

During the time interval from t7 to t8, the switches Q4 and Q5 are turned on. The turned on Q4 and Q2 during the time interval from t7 to t8 may provide a zero voltage across the inductor Lmid. As a result, the current iLmid is kept constant as shown in FIG. 3.

As shown in FIG. 3, the turn-on time of the switch Q1 is defined as D1. The phase difference between the switch Q1 and the switch Q3 is defined as D2. By controlling D2, both the switch Q1 and the switch Q2 can achieve zero voltage switching.

One advantageous feature of the hybrid power converter 100 is that the switches Q1, Q2, Q3, Q4, Q5 and Q6 may achieve a zero voltage turn-on and secondary switches S1, S2, S3 and S4 are of zero voltage switching and/or zero current switching. Such zero voltage switching and zero current switching help to reduce the total power losses of the hybrid power converter 100 shown in FIG. 2.

Figure 4:
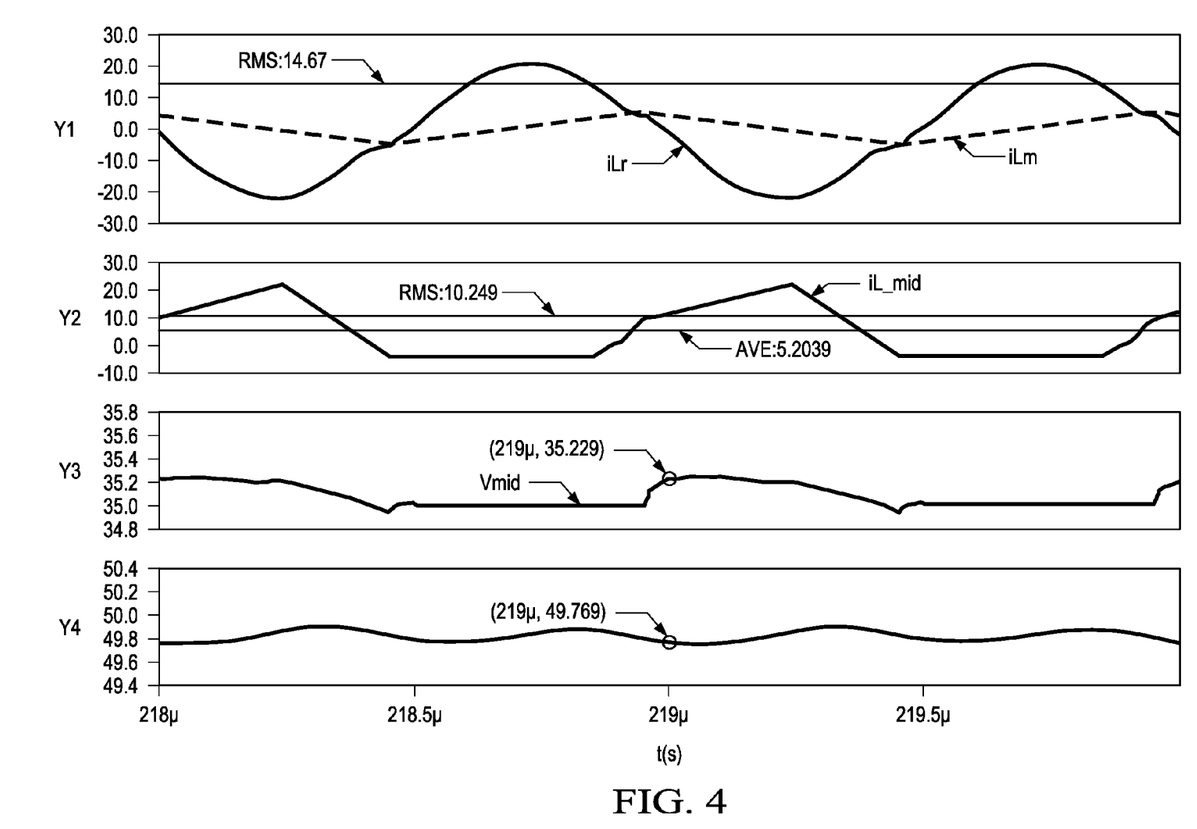
FIG. 4 illustrates a first group of switching waveforms of the hybrid power converter shown in FIG. 2 in accordance with various embodiments of the present disclosure.

FIG. 4 illustrates a first group of switching waveforms of the hybrid power converter shown in FIG. 2 in accordance with various embodiments of the present disclosure. The horizontal axis of FIG. 4 represents intervals of time. The unit of the horizontal axis is micro second. There may be four vertical axes. The first vertical axis represents the currents flowing through the inductor Lr and the inductor Lm. The second vertical axis represents the current flowing through the inductor Lmid. The third vertical axis represents the voltage at the capacitor Cmid. The fourth vertical axis represents the voltage at the output of the hybrid power converter 100.

The waveforms are obtained based upon the following operating conditions. Lmid is equal to 300 nH; Cmid is equal to 5 uF; Co is equal to 10 uF; Np is equal to 5; Ns is equal to 6; Lm is equal to 2 uH; Lr is equal to 30 nH; Cr is equal to 700 nF. The full load power of the hybrid power converter 100 is equal to 500 W. The switching frequency of hybrid power converter 100 is about 1 MHz. Vin is in a range from 36 V to 60 V. Vo is in a range from 34 V to 55 V. The waveforms in FIG. 4 are generated based upon an input voltage of 48 V and an output voltage of 50 V.

The RMS value of the current flowing through the resonant inductor Lr is about 14.67 A. The RMS value of the current flowing through the inductor Lmid is about 10.249 A. The difference between the current flowing through the resonant inductor Lr and the current flowing through the inductor Lmid indicates a portion of the output power of the hybrid power converter 100 is attributed to the non-isolated stage 103, which is a PWM stage. The portion of the output power from the non-isolated stage 103 may be processed by the LLC resonant converter 200 since the non-isolated stage 103 and the LLC resonant converter 200 are connected in cascade. The rest of the output power is directly delivered by the LLC resonant converter 200, which is a resonant stage. In other words, in a switching cycle, both the non-isolated stage 103 and the LLC resonant converter 200 deliver energy to the output of the hybrid power converter 100.

The voltage waveform shown in the third row indicates the ripple voltage of the capacitor Cmid is relatively small when the capacitance of Cmid is equal to 5 uF. On the other hand, the voltage waveform shown in the fourth row indicates the ripple voltage of the capacitor Co is relatively small when the capacitance of Co is equal to 10 uF.

Figure 5:
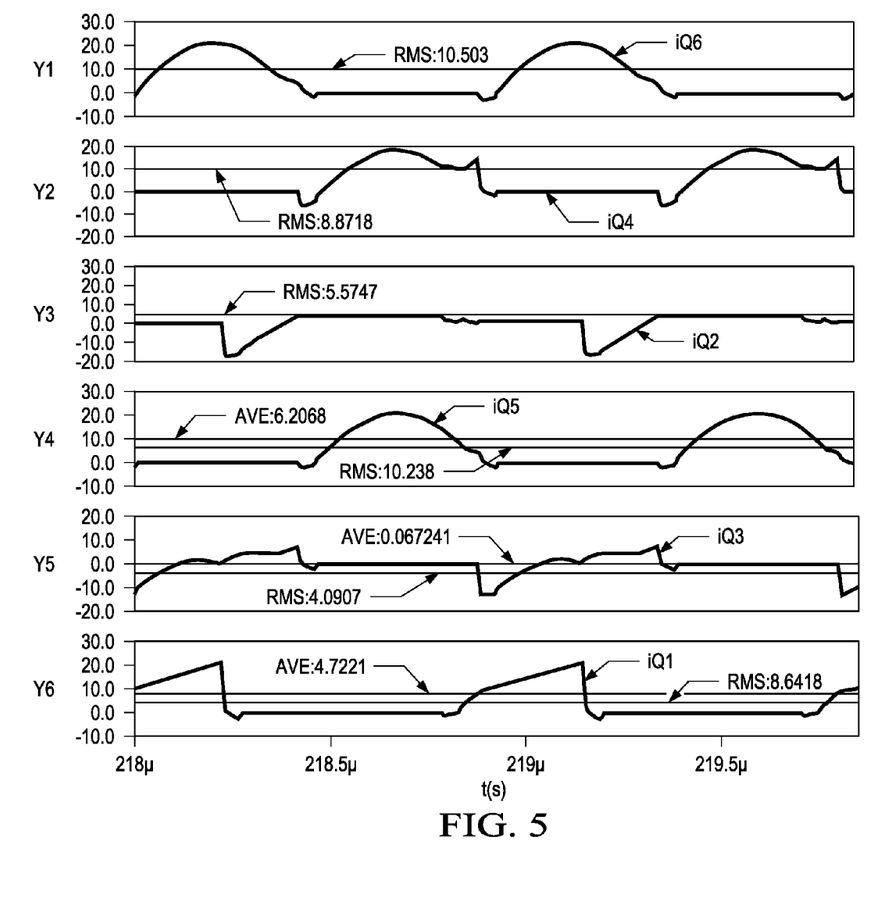
FIG. 5 illustrates a second group of switching waveforms of the hybrid power converter shown in FIG. 2 in accordance with various embodiments of the present disclosure.

FIG. 5 illustrates a second group of switching waveforms of the hybrid power converter shown in FIG. 2 in accordance with various embodiments of the present disclosure. The horizontal axis of FIG. 4 represents intervals of time. There may be six vertical axes. The first vertical axis represents the current flowing through Q6. The second vertical axis represents the current flowing through Q4. The third vertical axis represents the current flowing through Q2. The fourth vertical axis represents the current flowing through Q5. The fifth vertical axis represents the current flowing through Q3. The sixth vertical axis represents the current flowing through Q1.

As shown in FIG. 5, the average current flowing through Q1 is equal to about 4.7 A. In other words, the non-isolated stage 103 delivers about 43% of the total power of the hybrid power converter 100. In addition, the current flowing through Q3 and Q4 may comprise two portions, namely a resonant current and a PWM current. The PWM current may follow in a direction opposite to the direction of the resonant current. As a result, a portion of the resonant current is canceled by the PWM current. FIG. 5 shows the total currents in Q3 and Q4 are relatively small in comparison with the currents flowing through Q5 and Q6.

In addition, FIG. 5 shows for each switch (e.g., Q1 to Q6), there may be a negative current flowing through the body diode of a switch prior to the turn-on of the switch. As a result, the switch can achieve a zero voltage turn-on transition.

Figure 6:
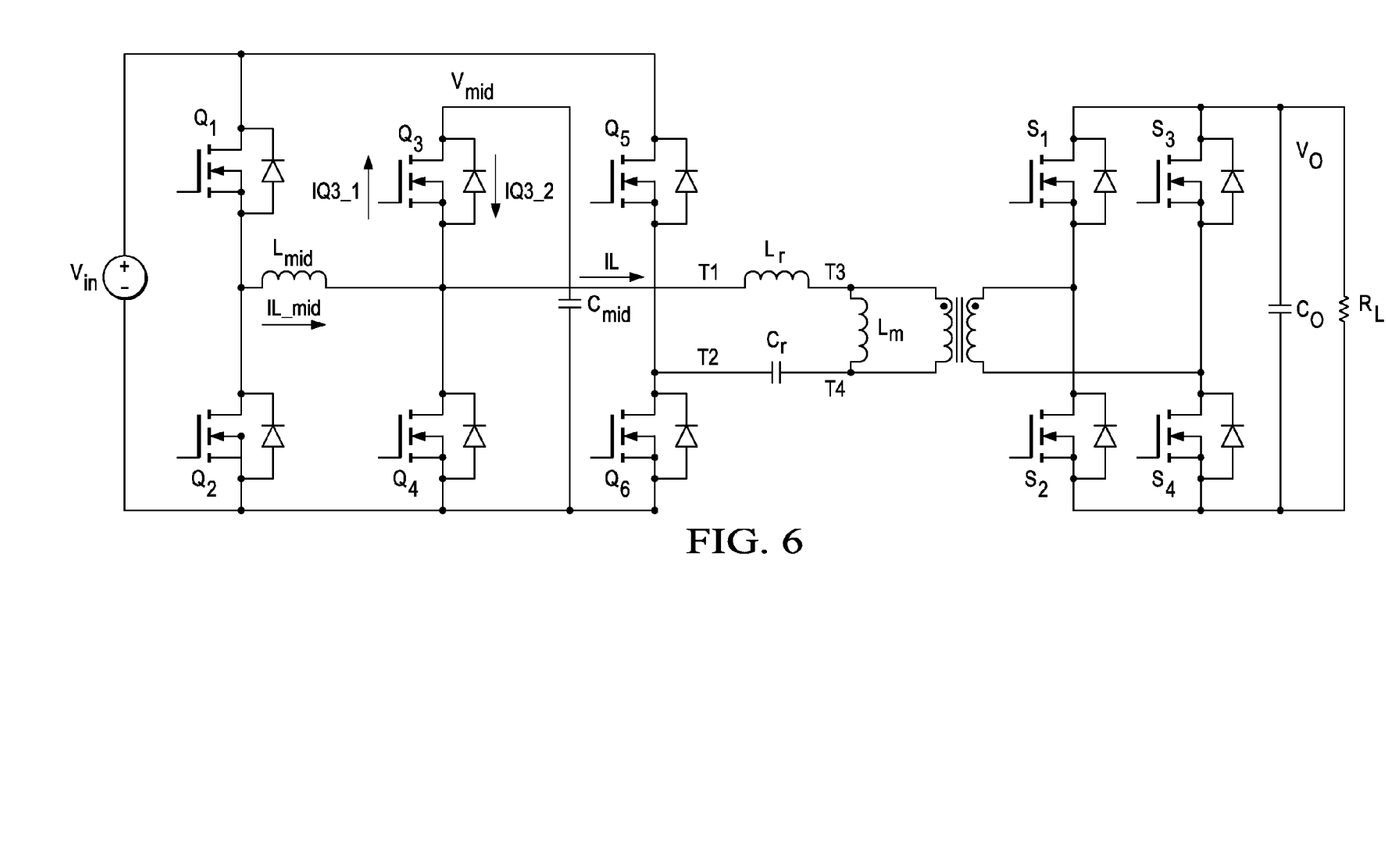
FIG. 6 illustrates a schematic diagram of a first operation mode of the hybrid power converter shown in FIG. 2 in accordance with various embodiments of the present disclosure.

FIG. 6 illustrates a schematic diagram of a first operation mode of the hybrid power converter shown in FIG. 2 in accordance with various embodiments of the present disclosure. During a first half cycle, when the current flowing through the inductor Lmid is positive, switch Q3 is of a low current stress. There may be two currents flowing through Q3. More particularly, both the PWM current from the non-isolated stage 103 and the resonant current from the LLC resonant converter 200 flow through Q3. Throughout the description, the current from the non-isolated stage 103 is alternatively referred to as the PWM current. Likewise, the current from the LLC resonant converter 200 is alternatively referred to as the resonant current.

As shown in FIG. 6, IQ3_2 is the resonant current flowing through Q3. IQ3_1 is the PWM current flowing through Q3. Since IQ3_1 and IQ3_2 are of opposite directions, a portion of the resonant current may be canceled by the PWM current. As a result, the total current flowing through Q3 is reduced. Such a reduced current flowing through Q3 helps to reduce the current stress as well as the conduction losses of Q3.

Referring back to FIG. 3, in a switching cycle, a turn-on time of Q3 is equal to or approximately equal to a turn-on time of Q6. Due to the cancellation between the PWM current and the resonant current at Q3, in the switching cycle, a current stress of Q3 is less than a current stress of Q6.

Figure 7:
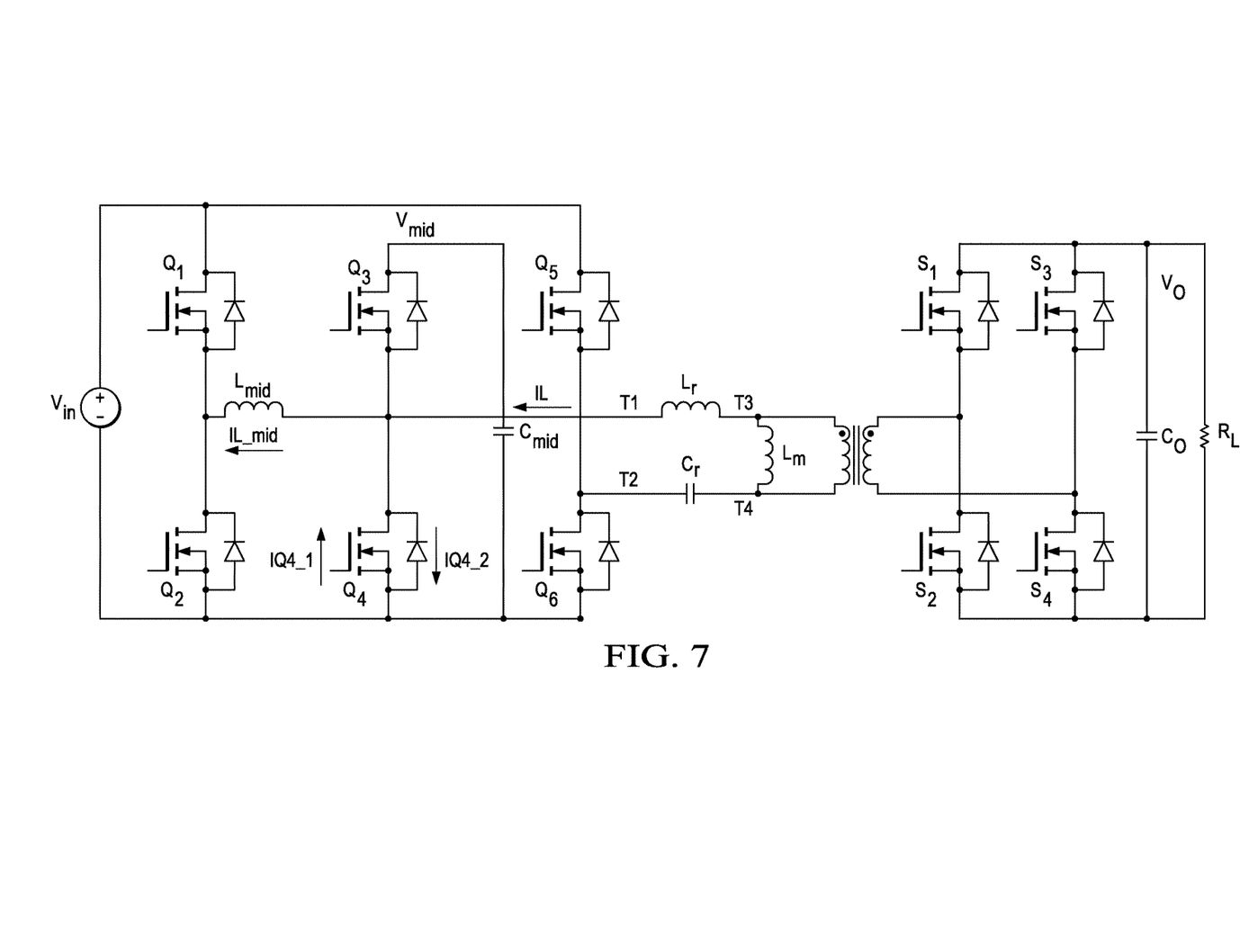
FIG. 7 illustrates a schematic diagram of a second operation mode of the hybrid power converter shown in FIG. 2 in accordance with various embodiments of the present disclosure.

FIG. 7 illustrates a schematic diagram of a second operation mode of the hybrid power converter shown in FIG. 2 in accordance with various embodiments of the present disclosure. During a second half cycle, when the current flowing through the inductor Lmid is negative, switch Q4 is of a low current stress. There may be two currents flowing through Q4. IQ4_2 is the resonant current flowing through Q4. IQ4_1 is the PWM current flowing through Q4. Since IQ4_1 and IQ4_2 are of opposite directions, a portion of the resonant current may be canceled by the PWM current. As a result, the total current flowing through Q4 is reduced. Such a reduced current flowing through Q4 helps to reduce the current stress as well as the conduction losses of Q4.

Referring back to FIG. 3, in a switching cycle, a turn-on time of Q4 is equal to or approximately equal to a turn-on time of Q5. Due to the cancellation between the PWM current and the resonant current at Q4, in the switching cycle, a current stress of Q4 is less than a current stress of Q5.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present application, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A hybrid power converter comprising:
an input DC source comprising a first DC common node and a second DC common node;
a non-isolated stage that comprises a first switch and a second switch in series, a non-isolated stage inductor coupled to a non-isolated stage common node of the first switch and the second switch, and the first switch is coupled to the first DC common node and the second switch is coupled to the second DC common node; and
a primary switch network that comprises a third, fourth, fifth, and sixth switch, and an intermediate capacitor, wherein the third switch and fourth switch are connected in series, the third switch is connected to the intermediate capacitor, the intermediate capacitor, the sixth switch, the fourth switch are connected to the second DC common node, and the fifth and sixth switch are in series, and the non-isolated stage inductor is coupled to an intermediate common node between the third and fourth switch, and the fifth switch is coupled to the first DC common node.

2. The hybrid power converter of claim 1, wherein:
the primary switch network is part of a resonant stage and the resonant stage is an inductor-inductor-capacitor (LLC) resonant converter operating at a fixed frequency.

3. The hybrid power converter of claim 1, wherein:
when the non-isolated stage operates at a step-up mode, a voltage across the intermediate capacitor is higher than the voltage of the input DC source.

4. The hybrid power converter of claim 1, wherein:
when the non-isolated stage operates at a step-down mode, a voltage across the intermediate capacitor is lower than the voltage at the input DC source.

5. The hybrid power converter of claim 1, wherein:
an output voltage of the hybrid power converter is proportional to a sum of a voltage of the input DC source and a voltage across the intermediate capacitor divided by two.

6. The hybrid power converter of claim 1, further comprising a resonant tank coupled to the non-isolated stage and the primary switch network.

7. The hybrid power converter of claim 6, wherein the resonant tank comprises a first resonant tank inductor, a second resonant tank inductor, and a resonant tank capacitor, wherein the first resonant tank inductor is coupled to the non-isolated stage inductor and the resonant tank capacitor is coupled to a node common to the fifth and sixth switch.

8. The hybrid power converter of claim 1, wherein:
a ratio of a power flowing through the non-isolated stage to a power flowing through the load is equal to a voltage across the intermediate capacitor divided by a sum of a voltage across the intermediate capacitor and the voltage of the input DC source.

9. The hybrid power converter of claim 1, wherein:
in a switching cycle, a turn-on time of the first switch is approximately equal to a turn-on time of the fourth switch, and wherein a current stress of the first switch is less than a current stress of the fourth switch; and
in the switching cycle, a turn-on time of the second primary switch is approximately equal to a turn-on time of the third primary switch, and wherein a current stress of the second primary switch is less than a current stress of the third primary switch.

10. The hybrid power converter of claim 1, wherein:
gate drive signals of the non-isolated stage switches are in sync with gate drive signals of the switches of the resonant stage.

11. The hybrid power converter of claim 1, wherein the resonant stage is configured to operate at a duty cycle of about 50%.

12. The hybrid power converter of claim 1, wherein:
the non-isolated stage is configured to operate in the buck converter mode in response to a first input voltage and operate in the boost converter mode in response to a second input voltage, and wherein the first input voltage is greater than the second input voltage.

13. A method for operating a hybrid power converter, wherein the hybrid power converter comprises a non-isolated stage and a resonant stage, the method comprising:
detecting an input direct current (DC) voltage of an input DC source;
detecting a voltage of an intermediate capacitor of a primary switch network of the resonant stage; and
operating a non-isolated stage of the hybrid power converter in a boost mode upon detecting the voltage of the intermediate capacitor is higher than the input DC voltage.

14. The method of claim 13, further comprising:
configuring the resonant stage to operate at a fixed switching frequency, wherein:
the resonant stage is an inductor-inductor-capacitor (LLC) resonant converter; and
the fixed switching frequency is approximately equal to a resonant frequency of the LLC resonant converter.

15. The method of claim 13, further comprising:
operating the resonant stage at a duty cycle of about 50%.

16. A method for operating a hybrid power converter, wherein the hybrid power converter comprises a non-isolated stage and a resonant stage, the method comprising:
detecting an input direct current (DC) voltage of an input DC source;
detecting a voltage of an intermediate capacitor of a primary switch network of the resonant stage; and
operating a non-isolated stage of the hybrid power converter in a buck mode upon detecting that the voltage of the intermediate capacitor is lower than the input DC voltage.

17. The method of claim 16, further comprising:
configuring the resonant stage to operate at a fixed switching frequency, wherein:
the resonant stage is an inductor-inductor-capacitor (LLC) resonant converter; and
the fixed switching frequency is approximately equal to a resonant frequency of the LLC resonant converter.

18. The method of claim 16, further comprising:
operating the resonant stage at a duty cycle of about 50%.

* * * * *